C. H. BROWN, C. L. SWARTOUT & M. J. FITZGERALD.
LIGHT SHIELD FOR AUTOMOBILES.
APPLICATION FILED JUNE 16, 1913.

1,263,030.

Patented Apr. 16, 1918.

WITNESSES
G. H. Ball
Léon Boillot

INVENTORS,
CHARLES H. BROWN
CHARLES L. SWARTOUT
MICHAEL J. FITZGERALD
By Francis M. Wright
ATTORNEY

UNITED STATES PATENT OFFICE.

CHARLES H. BROWN, CHARLES L. SWARTOUT, AND MICHAEL J. FITZGERALD, OF RICHMOND, CALIFORNIA; SAID SWARTOUT AND SAID BROWN ASSIGNORS TO SAID FITZGERALD.

LIGHT-SHIELD FOR AUTOMOBILES.

1,263,030.

Specification of Letters Patent. Patented Apr. 16, 1918.

Application filed June 16, 1913. Serial No. 773,888.

*To all whom it may concern:*

Be it known that we, CHARLES H. BROWN, CHARLES L. SWARTOUT, and MICHAEL J. FITZGERALD, citizens of the United States, residing at Richmond, in the county of Contra Costa and State of California, have invented new and useful Improvements in Light-Shields for Automobiles, of which the following is a specification.

Persons driving automobiles or street cars and meeting another automobile or street car at night time experience great difficulty in looking ahead owing to the glare of the concentrated rays from the head light of the approaching automobile or car. It has heretofore been attempted to overcome this difficulty by attaching an opaque screen to the metal edge or frame of the wind shield of the automobile. In many cases, as in street cars, for instance, such a device can not be used at all, and, even when used with automobiles, it requires that the wind shield should be lowered below the face of the driver in order that the glare protector may be used. It was therefore necessary for the driver either to endure the inconvenience of not being protected from the wind or rain, if he wished to be protected from the glare of an approaching light, or to endure the inconvenience of not being protected from said glare, if he wished to be protected from the weather. Since the former inconvenience is greater and more continuous than the latter, the consequence was that the glare protector was little, if ever, used.

The object of the present invention is to provide a glare protector which can be used, not only on automobiles which have a wind shield with a free edge, but also on those which have an entirely closed glass front, and also on street cars, and, when the automobile has an open wind shield, can also be used without taking down the upper portion of the wind shield, and behind or in front of the lower portion thereof, and with a wind shield which is at or above the level of the face of the driver.

Figure 1:
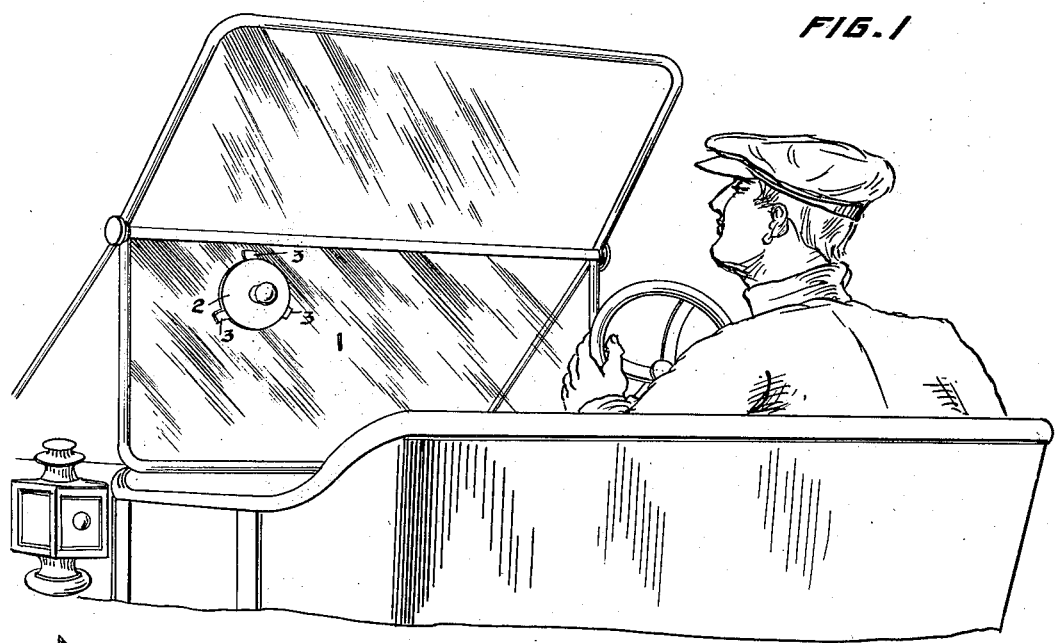
Figure 2:
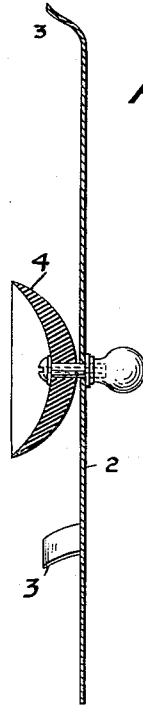

In the accompanying drawing, Figure 1 is a broken perspective view of an automobile equipped with our invention; Fig. 2 is a cross-sectional view of the device detached.

Referring to the drawing, 1 indicates the glass wind shield of an automobile. On the rear side of said shield is secured our improved device which comprises a disk 2 formed with spring feet 3 to rest against the wind shield and with a central suction cup 4. By means of said cup said glare protector can be secured at any point desired upon the glass shield. It will in general be so secured at a point located not directly in front of the driver, but between his eyes and the track or path upon which the approaching car or automobile is traveling. It can be readily removed in the day time and replaced at night.

We are aware that a glare protector has been devised which is secured to the metal frame of a wind shield and extends upwardly therefrom and we do not claim a glare protector broadly. Such a device, however, requires that the wind shield itself should be below the level of the driver's eyes, and therefore the driver's face should be exposed to the wind and rain. It is obvious that our device is not open to these objections. Moreover, it can be readily detached and replaced on any part of the glass surface except on the extreme edge thereof.

We claim:—

1. A glare protector comprising a light obstructing member, and means carried thereby for removably attaching said member directly to substantially any part of the glass surface of a wind shield of a vehicle.

2. A glare protector comprising a light obstructing member, and a suction member carried thereby for removably attaching said member to substantially any part of the glass surface of a wind shield of a vehicle.

In testimony whereof we have hereunto set our hands in the presence of two subscribing witnesses.

CHARLES H. BROWN.
CHARLES L. SWARTOUT.
MICHAEL J. FITZGERALD.

Witnesses:
H. L. PENRY,
E. J. ROYCE.